United States Patent
Bauer et al.

(10) Patent No.: US 8,253,920 B2
(45) Date of Patent: Aug. 28, 2012

(54) METHOD AND APPARATUS FOR ADJUSTING THE PICTURE DEFINITION ON THE CAMERA LENS OF A MOTION PICTURE CAMERA

(75) Inventors: Fritz Gabriel Bauer, Purkerdorf (AT); Michael Haubmann, Vienna (AT)

(73) Assignee: Arnold & Richter Cine Technik GmbH & Co. Betriebs KG, Munich (DE)

(*) Notice: Subject to any disclaimer, the term of this patent is extended or adjusted under 35 U.S.C. 154(b) by 959 days.

(21) Appl. No.: 10/594,287

(22) PCT Filed: Mar. 15, 2005

(86) PCT No.: PCT/DE2005/000497
§ 371 (c)(1),
(2), (4) Date: May 27, 2008

(87) PCT Pub. No.: WO2005/096618
PCT Pub. Date: Oct. 13, 2005

(65) Prior Publication Data
US 2008/0225234 A1    Sep. 18, 2008

(30) Foreign Application Priority Data
Mar. 25, 2004   (DE) .......................... 10 2004 015 947

(51) Int. Cl.
*G03B 3/00* (2006.01)
(52) U.S. Cl. .................. 352/139; 352/140; 348/345
(58) Field of Classification Search .............. 352/139, 352/140, 141, 170; 353/101; 396/80, 79, 396/137; 348/333.01, 333.06, 341, 345, 348/346, 348
See application file for complete search history.

(56) References Cited

U.S. PATENT DOCUMENTS
4,191,460 A * 3/1980 Fujiki .............................. 396/88
4,320,947 A   3/1982 Komine
(Continued)

FOREIGN PATENT DOCUMENTS
DE   42 05 397 A1   8/1993
(Continued)

OTHER PUBLICATIONS
International Search Report, dated Jul. 1, 2005, corresponding to PCT/DE2005/000497.
(Continued)

Primary Examiner — William C Dowling
(74) Attorney, Agent, or Firm — Christie, Parker & Hale, LLP

(57) ABSTRACT

A method for adjusting the picture definition on the camera lens of a motion picture camera. A drive unit is connected to the camera lens which is driven, in the manual focusing operation, by an picture definition handwheel of an operating unit, which displays the adjusted picture definition on a scale dial, and, in the automatic focusing operation, by an auto-focusing device for measuring the distance from an object to be recorded by the motion picture camera and outputting control signals to an electromechanical actuator, which is connected to the picture definition handwheel or to the scale dial of the operating unit, for adjusting or readjusting the picture definition adjusted on the picture definition handwheel or displayed on the scale dial as a function of the distance measured from the object to be recorded.

25 Claims, 3 Drawing Sheets

U.S. PATENT DOCUMENTS

| | | | |
|---|---|---|---|
| 4,371,240 A * | 2/1983 | Shimizu et al. | 352/140 |
| 4,556,907 A * | 12/1985 | Urata et al. | 348/211.4 |
| 4,777,505 A * | 10/1988 | Hata et al. | 396/103 |
| 5,003,400 A | 3/1991 | Murakami et al. | |
| 5,092,670 A * | 3/1992 | Preston | 352/140 |
| 5,648,836 A * | 7/1997 | Sato et al. | 396/86 |
| 5,654,757 A | 8/1997 | Murakami et al. | |
| 6,148,151 A | 11/2000 | Bauer | |
| 6,161,933 A | 12/2000 | Tschida et al. | |
| 2003/0011692 A1 | 1/2003 | Shore et al. | |
| 2004/0046938 A1 | 3/2004 | Gero | |
| 2009/0051806 A1 * | 2/2009 | Haubmann | 348/347 |

FOREIGN PATENT DOCUMENTS

| | | |
|---|---|---|
| DE | 94 15 170.9 U1 | 12/1994 |
| DE | 196 29 484 A1 | 1/1998 |
| EP | 0 574 105 A1 | 12/1993 |
| EP | 0 575 022 B1 | 12/1993 |
| EP | 0 843 188 A2 | 5/1998 |
| EP | 0 942 305 A1 | 9/1999 |
| JP | 2-226878 | 9/1990 |

OTHER PUBLICATIONS

Patent Abstracts of Japan, Publication No. 02226878, Published on Sep. 10, 1990, in the name of Inoue.

English translation of International Preliminary Examination Report for PCT/DE2005/000497, dated Feb. 8, 2007.

* cited by examiner

METHOD AND APPARATUS FOR ADJUSTING THE PICTURE DEFINITION ON THE CAMERA LENS OF A MOTION PICTURE CAMERA

CROSS-REFERENCE TO A RELATED APPLICATION

This application is a National Phase patent application of International Patent Application Number PCT/EP2005/000497, filed on Mar. 15, 2005, which claims priority of German Patent Application Number 10 2004 015 947.5, filed on Mar. 25, 2004.

BACKGROUND

The invention relates to a method for adjusting the picture definition on the camera lens of a motion picture camera and to an apparatus for carrying out the method.

It is known to connect a follow focus, which is operated manually by a focus puller in order to relieve the cameraman, to the camera lens in order to adjust the picture definition and to focus images to be recorded or sequences to be recorded by motion picture cameras. Either the follow focus is connected mechanically to the lens ring for adjusting the picture definition of the camera lens, or a drive unit, which is operated by an electric motor and arranged horizontally or vertically on the camera lens, uses a toothed pinion to transmit a torque to the external teeth of the picture definition lens ring for sharp focusing according to EP 0 575 022 B1.

At the same time, the drive unit for adjusting the position of the picture definition lens ring can be used as an apparatus, coupled to the lens ring, for determining the actual state of the lens ring position according to EP 0 942 305 A1, which apparatus determines the actual position of the lens ring in relation to the lens and converts it into a measurement output signal.

The drive unit for picture definition adjustment can be driven, in accordance with EP 0 574 105 A1, using a control system comprising a plurality of motor units for adjusting the zoom, focus and shutter functions, which motor units are coupled, in accordance with EP 0 575 022 B1, to the lens rings of the camera lens of a motion picture camera and in which position encoders are integrated, and one or more hand-held operating units which can be used to adjust, in an analog and/or electronic fashion, both adjustment values and range limits. The motor units and the hand-held operating unit are connected to one another via a serial control and data bus.

Alternatively, in accordance with DE 196 29 484 A1, the connection between the drive units coupled to the lens rings of the camera lens of the motion picture camera and the position encoders with one or more hand-held operating units for adjusting the zoom, picture definition and shutter functions can be provided via a wire-free control and monitoring of camera functions and thus for adjusting the picture definition, in which a camera-side control and detection unit is connected, via line connections, with a focus, zoom and iris drive unit and which includes a radio modem which transmits control signals to a remote-control unit and receives them from the latter. The operator-side control unit has, for focusing and adjusting the picture definition, a handwheel backed by a scale on which range limits for adjusting the picture definition can be adjusted. A potentiometer connected to the handwheel prescribes absolute values as setpoint values for adjusting the picture definition on the camera lens, which values are transmitted, via the radio transmission link, to the camera-side control and detection unit which adjusts the motor or drive unit connected to the picture definition lens rings to the setpoint position prescribed by the operator-side control unit, in order to adjust the picture definition lens ring.

Since manual focusing can be carried out in specific recording situations only with great difficulty, for example at large or very small distances and with very rapid picture definition variations, it is known from DE 42 05 397 A1, for example, to apply automatic focusing, in which an auto-focusing unit uses an ultrasonic or laser measurement appliance to detect the distance between an object to be recorded and the motion picture camera, and adjusts the picture definition necessary to focus the image to be recorded or the sequence to be recorded on the camera lens of the motion picture camera.

In many applications a change-over from automatic focusing to manual focusing is desired. When switching over from the automatic focusing operation to the manual focusing operation, which may be necessary, for example, if an object to be recorded disappears from the image to be recorded and the picture definition is set to infinity, the problem occurs that the picture definition setpoint value, which was prescribed manually and was adjusted on the manual operating unit, is adopted, which setpoint value deviates from the last setpoint value output by the auto-focusing device to the drive unit for picture definition adjustment, such that intolerable blurring or undesired picture definition shifts result when the automatic focusing operation changes over to the manual focusing operation.

SUMMARY

An exemplary embodiment of the present invention is to rule out variations in the picture definition adjusted on the camera lens of a motion picture camera when the automatic focusing operation changes over to the manual focusing operation.

The solution according to the invention ensures that no picture definition variations and in particular no undesired blurring or definition shifts occur when the automatic focusing operation changes over to the manual focusing operation.

Since the auto-focusing device adjusts the picture definition continuously, readjustment of the auto-focusing device is not necessary, and so no undesired blurring in an image to be recorded, which was previously focused manually, occurs when the manual focusing operation changes over to the automatic focusing operation. If a specific blurring in the image to be recorded was adjusted during the previous manual focusing operation, this specifically adjusted blurring is maintained at the point in time when the manual focusing operation changes over to the automatic focusing operation, and the image to be recorded is subsequently focused using the auto-focusing device.

The control signals output by the auto-focusing device can adjust or readjust the input or display device of the operating unit continuously or at intervals during the automatic focusing operation.

If the input or display device of the operating unit is continuously readjusted using the setpoint values or control signals output by the auto-focusing device, a continuous equalization of, for example, an picture definition handwheel or a scale dial of the operating unit to the setpoint value output by the auto-focusing device takes place. Alternatively, the picture definition handwheel or the scale dial of the operating unit is adjusted or readjusted at prescribable intervals to the setpoint value output by the auto-focusing apparatus during the automatic focusing operation.

The input or display device of the operating unit is preferably adjusted before the start of the manual focusing operation using the control signals output by the auto-focusing device at the end of the automatic focusing operation.

The control signals or setpoint values output by the auto-focusing device during the automatic focusing operation can be output either to an electromechanical actuator of the input or display device or to an electronic control or display device of the operating unit.

An electromechanical actuator for the input or display device of the operating unit may be a motor/gear unit, a direct drive in the form of an electric motor or ultrasonic motor, or the like. In an electronic control or display device of the operating unit, a slide controller, a momentary contact switch in the fashion of a joystick or the like, for example, are provided as input device and an LED or LCD display of the adjusted picture definition.

In one embodiment of the invention, the input or display device of the operating unit is adjusted to the picture definition adjusted by the auto-focusing device when the automatic focusing operation switches over to the manual focusing operation, and the input device of the operating unit is then used to adjust or readjust the picture definition on the camera lens.

An apparatus for carrying out the method according to the invention includes:
- at least one drive unit connected to the camera lens of the motion picture camera for adjusting the picture definition,
- an operating unit with at least one input device for manually adjusting, readjusting or delimiting the adjustment range of the picture definition and one display unit for displaying the adjusted picture definition and/or the delimitation of the adjustment range of the picture definition,
- an auto-focusing device for measuring the distance from an object to be recorded by the motion picture camera and outputting control signals for controlling the picture definition as a function of the measured distance from the object to be recorded, and
- a device for adjusting or readjusting the input or display device of the operating unit as a function of the control signals output by the auto-focusing device.

Irrespective of whether the operating unit employed is a manual follow focus for transmitting rotational movements, a definition adjustment ring of a camera lens or a wired or wire-free transmission from a remote control unit to a lens control of the motion picture camera, this apparatus produces a match between the definition position, determined by the auto-focusing device and adjusted on the picture definition lens ring of the camera lens, and the definition position adjusted and displayed on the operating unit, to which end the device for adjusting or readjusting the input or display device of the operating unit moves, as a function of the control signals output by the auto-focusing device, the input device, in the form of a manual picture definition handwheel or at least a part of the picture definition handwheel, for example, or the display device, in the form of a scale dial, into a position which corresponds to the control signals output by the auto-focusing device, this being done by electric motor or electronically.

The apparatus can be configured in various ways, depending on how the drive unit is driven, by using a wired or wire-free connection to a remote control unit or by means of a manual follow focus.

If the drive unit can be driven using an electric line connection or a radio connection by the operating unit in the manual focusing operation and by the auto-focusing device in the automatic focusing operation, which auto-focusing device, in the automatic focusing operation, outputs control signals both to the drive unit and to the operating unit using electric line connections or a radio connection, the input device of the operating unit includes in this configuration an electromechanical actuator for outputting position-dependent signals for adjusting or readjusting the picture definition, whose position in relation to a reference position can be varied as a function of the control signals output by the auto-focusing device, with the electromechanical actuator preferably comprising a focusing or picture definition handwheel in the form of an absolute encoder.

The display device of the operating unit can comprise a scale dial, in particular a scale dial which can be written on, whose position in relation to a reference position can be varied as a function of the control signals output by the auto-focusing device.

In addition, the scale dial can be connected to stops for delimiting the picture definition adjustment range, whose position on the scale dial can be varied as a function of the control signals output by the auto-focusing device.

The scale dial and/or the stops for delimiting the picture definition adjustment range are reset using a differential gear mechanism without resetting the input device, or the input device and/or the display device of the operating unit is reset, as a function of the control signals output by the auto-focusing device, using a motor/gear arrangement or using a direct drive, in particular using an electric motor or an ultrasonic motor, in order to adjust or readjust the control signal or setpoint value output by the auto-focusing device. Here, the input device and/or the display device of the operating unit can be connected to the motor/gear arrangement or to the direct drive via a clutch.

If the operating unit comprises a manual follow focus with an picture definition handwheel and a scale dial with stops for delimiting the picture definition adjustment range, an electric motor can be plugged onto the manual follow focus, which electric motor can be disconnected during the manual focusing operation and can be driven by the auto-focusing device in the automatic focusing operation such that the position of the picture definition handwheel and/or the scale dial and/or the stops for delimiting the picture definition adjustment range can be varied as a function of the control signals output by the auto-focusing device. During the manual focusing operation, the electric motor can here be disconnected mechanically or electrically or using a clutch which can be released.

In both configurations the operating unit can be connected to a microprocessor via a position encoder, which microprocessor resets the input and/or display device of the operating unit as a function of the control signals output by the auto-focusing device using an actuating motor and a gear mechanism, an auto-focus momentary contact switch or auto-focus switch for initiating the automatic or manual focusing operation being connected to an input of the microprocessor.

If an auto-focus momentary contact switch is arranged, a transfer of the picture definition setpoint value(s), output by the auto-focusing device to the drive unit connected to the camera lens, to the operating unit is triggered, while an auto-focus switch activates the automatic focusing operation in a first position, and the manual focusing operation in a second position, the control signals of the auto-focusing device being applied to the operating unit in the first position of the auto-focus switch and/or when the auto-focus switch is switched over from the first into the second position.

BRIEF DESCRIPTION OF THE DRAWINGS

Further features and advantages of the invention will be explained by reference to exemplary embodiments illustrated in the figures, in which.

DETAILED DESCRIPTION

Figure 1:
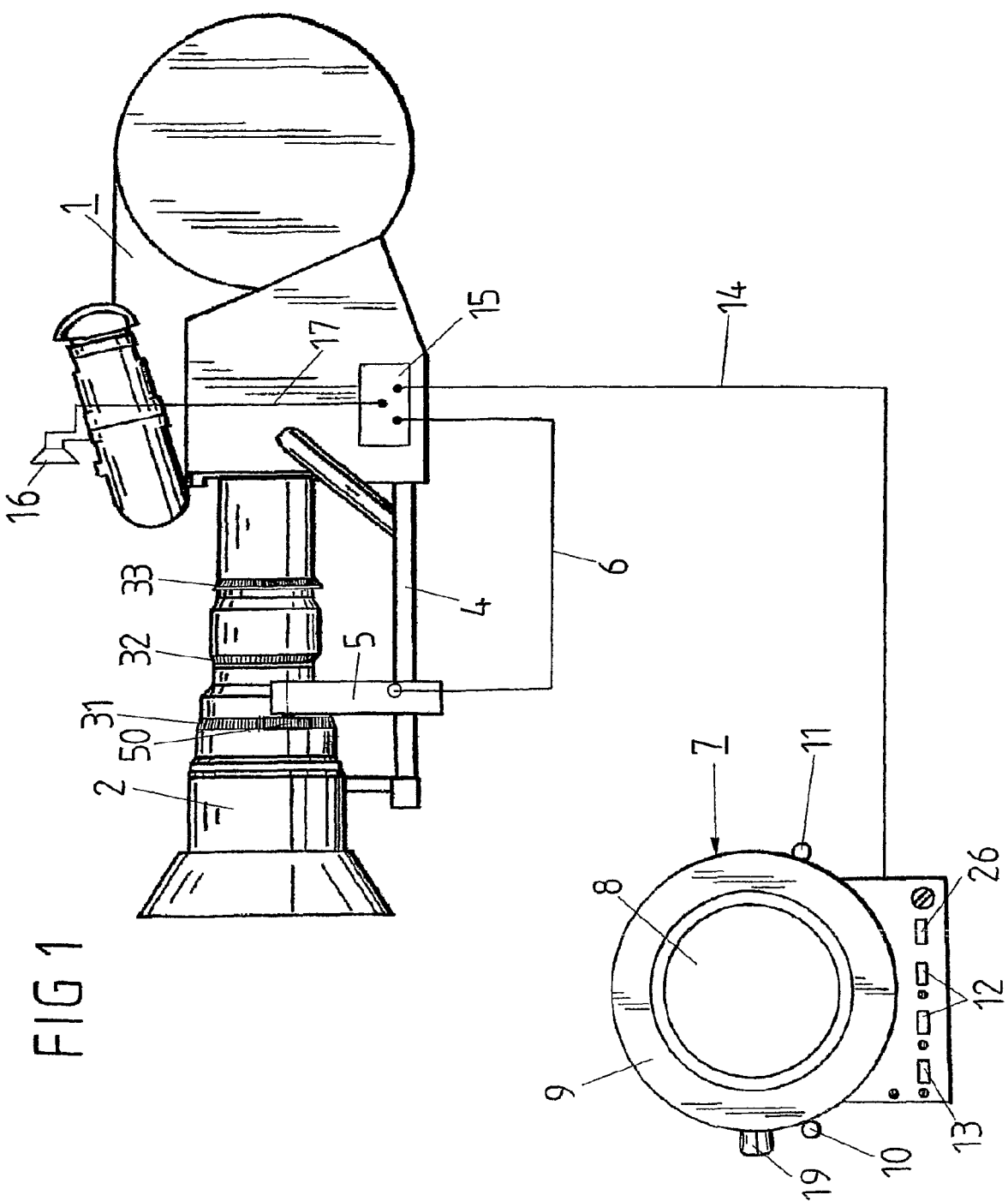
FIG. 1 shows a schematic illustration of an picture definition adjustment on the camera lens of a motion picture camera in the automatic focusing operation with an auto-focusing device, or in the manual focusing operation with a manual operating apparatus connected to the motion picture camera via a cable.

FIG. 1 shows a schematic arrangement of a motion picture camera 1 with a camera lens 2, attached to a camera housing 3, having three lens rings 31, 32, 33 with external teeth, of which the lens ring 31 is used for picture definition adjustment, the lens ring 32 is used for adjusting the shutter aperture of an iris shutter and the lens ring 33 is used for focal length (zoom) adjustment of the camera lens 2.

Drive units, of which only the drive unit 5 is of interest for adjusting the picture definition is shown for better recognizability, are assigned to the lens rings 31, 32, 33. As shown schematically in FIG. 2, the drive units 5 are here attached to two iris rods 4 connected to the housing of the motion picture camera 1, and respectively engage in the external teeth of the lens ring 31, 32, 33 assigned to them by means of a pinion 50 in order to adjust a predetermined setpoint state of the lens rings 31, 32, 33.

The drive units 5 are connected to a control terminal 15 of the motion picture camera 1 via a cable connection 6. If a control command is output to one of the drive units 5 via the control terminal 15 and the cable connection 6, the drive unit 5 sets the pinion 50, which is driven by an electric motor, in rotary motion until the prescribed setpoint position of the relevant lens ring 31, 32, 33 is reached.

Setpoint values for picture definition adjustment of the camera lens 2 are output optionally by means of a manual operating unit 7 or an auto-focusing device 16 connected to the motion picture camera 1, which are connected to the control terminal 15 of the motion picture camera 1 via electric lines 14 and 17. The manual operating unit 7 has a handwheel 8 for adjusting the picture definition, an exchangeable scale dial 9 that can be provided with additional or alternatively dedicated markings, a reference marking 19 and displaceable, mechanically adjustable end stops 10, 11. The end stops 10, 11 can be used to define end points of the adjustment motion of the manual operating unit shown in FIG. 1.

Pressure switches 12, for electronically adjusting and delimiting the range over which the picture definition can be varied, are provided for precise adjustment of the picture definition lens ring 31. In this manner, the adjustment range can be delimited as desired, while the entire rotation range of the picture definition handwheel 8 remains available nevertheless between the adjusted end stops 10, 11 for the delimited range such that the picture definition lens ring 31 can be adjusted extremely precisely, corresponding to a mechanical follow focus, with a gear reduction for particularly sensitive regulation.

Moreover, delimiting the range of the picture definition adjustment allows for the picture definition lens ring 31 to be positioned exactly and with accurate reproduction to the adjustment values defined by the range limits such that work can proceed with defined start and end conditions if scenes to be recorded are repeated.

A further momentary contact switch 13 is used for automatically calibrating the end stops of the picture definition lens ring 31 so as to protect the lens stop.

The auto-focusing device 16 includes a distance measurement device for determining the distance of an object to be recorded from the motion picture camera 1 using infrared or ultrasound measurement, and a setpoint value encoder for outputting a setpoint value to a control and regulating device inside the camera or directly to the drive unit 5 via the control terminal 15 and the cable connection 6 so as to adjust the picture definition lens ring 31 to the prescribed setpoint position.

An apparatus for determining the actual state of the position of the lens rings 31, 32, 33 can be provided in addition to the drive unit 5 or in combination with the drive unit 5, which device determines the current position of the lens rings 31, 32, 33 in relation to the camera lens 2 and converts it into a measurement output signal such that the adjustment movements executed using the drive units 5 can be controlled and readjusted, if necessary.

An auto-focus key or switch 26 arranged on the operating unit 7 is provided for changing over from the automatic focusing operation to the manual focusing operation, and when it is operated the setpoint value output of the manual operating unit 7 replaces the setpoint value output of the auto-focusing device 16. The control or setpoint value signal, which is output by the auto-focusing device 16 to the drive unit 5 via the control device of the motion picture camera 1, is emitted to the manual operating unit 7 at the same time in order to readjust the setpoint value adjustment on the manual operating unit 7 during, or at the end of, the automatic focusing operation. The control signal can be output to the manual operating unit 7 during the automatic focusing operation continuously or at prescribed intervals. Alternatively, the adjustment of the manual operating unit 7 can be matched to the last setpoint value output by the auto-focusing device 16 when the auto-focus key 26 is operated, before the control device of the motion picture camera 1 further processes the setpoint value signals output by the manual operating unit 7 in order to adjust the picture definition lens ring 31 by using the drive unit 5.

Figure 3:
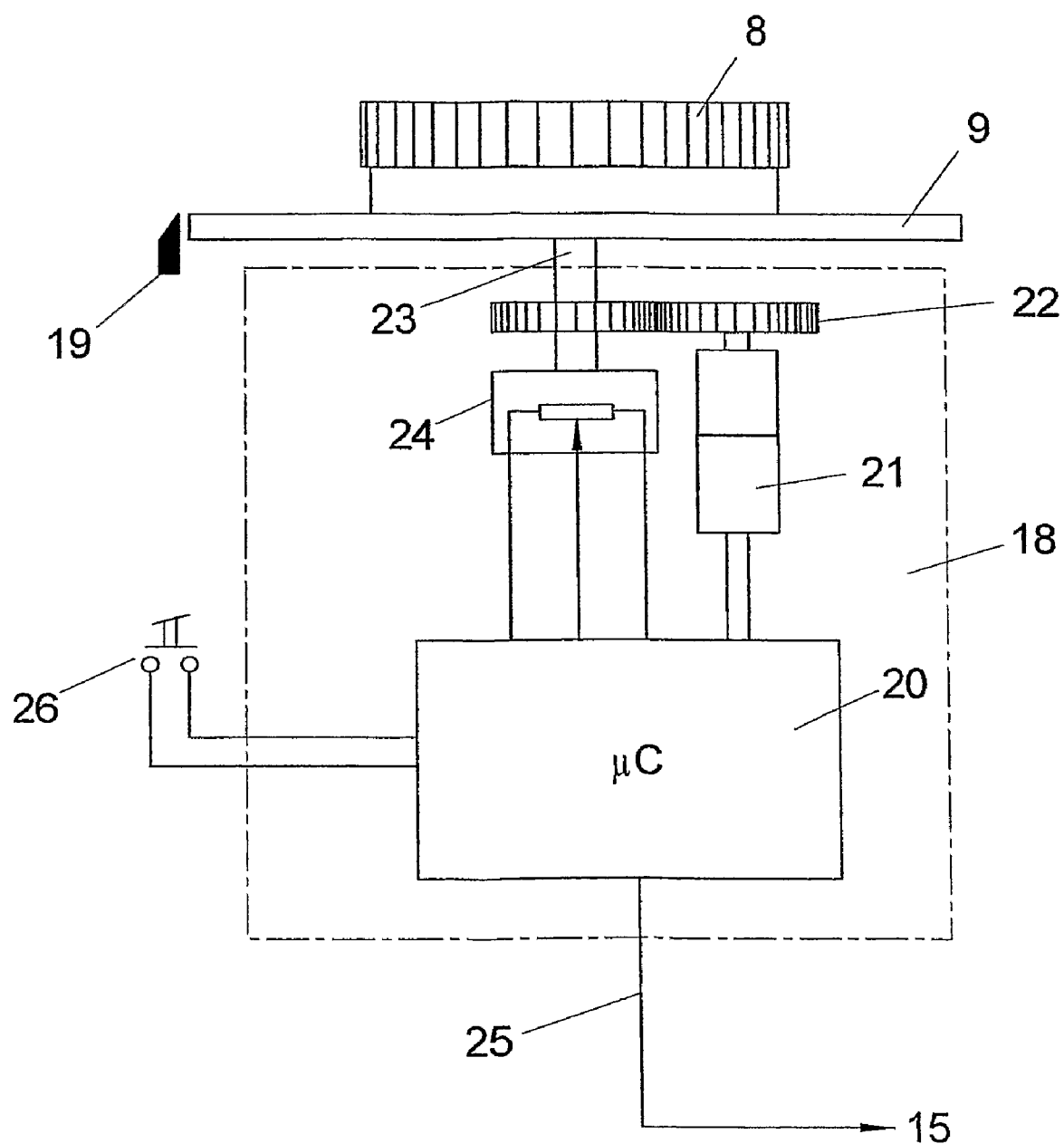
FIG. 3 shows a schematic illustration of a device for adjusting or readjusting the input or display device of the operating unit.

A suitable drive device is provided for adjusting or readjusting the operating elements 8 to 11 of the manual operating unit 7, for example an electromechanical actuator 18 illustrated in FIG. 3, a direct drive or the like.

In order to readjust or adjust the setpoint value, either the picture definition handwheel 8 is adjusted or readjusted using the electromechanical actuator 18 according to FIG. 3 or using a direct drive by means of an electric motor or ultrasonic motor, or the scale dial 9 and the stops 10, 11 are rotated using a differential gear mechanism without the picture definition handwheel 8 co-rotating during the resetting.

Alternatively, the scale dial 9 can be rotated in conjunction with the stops 10, 11 by the drive device, with the picture definition handwheel 8 having previously been decoupled.

Instead of a cable connection between the manual operating unit 7 and the control terminal 15 of the motion picture camera 1, cable-free data transmission can be provided using a microwave transceiver, in which the control device of the motion picture camera 1 is connected to a camera-side control and detection unit and to the drive units 5 for resetting the lens rings 31, 32, 33 of the camera lens 2. The operating unit 7, in this configuration, likewise has an operating handwheel or a plurality of operating handwheels for inputting zoom, iris and/or focusing setpoint values, corresponding scale dials for displaying, and a radio modem, which is connected to an antenna and is used to transmit the setpoint values adjusted on the operating handwheels to the camera-side control and detection unit.

If the setpoint values adjusted on the manual remote control unit are generated using potentiometers, encoding disks or the like, a direct drive or an electromechanical actuator is provided for adjusting the operating handwheel or the scale dial and the stops in order to readjust the setpoint values output by the auto-focusing device in a manner analogous to the cabled signal transmission described above. In this embodiment, readjustment is also carried out continuously or at intervals or when operating a momentary contact switch for changing over from the automatic focusing operation into the manual focusing operation by inputting the last setpoint value output by the auto-focusing device in order to adjust the operating handwheel or the scale dial and the stops before the remote control unit outputs a setpoint value.

Figure 2:
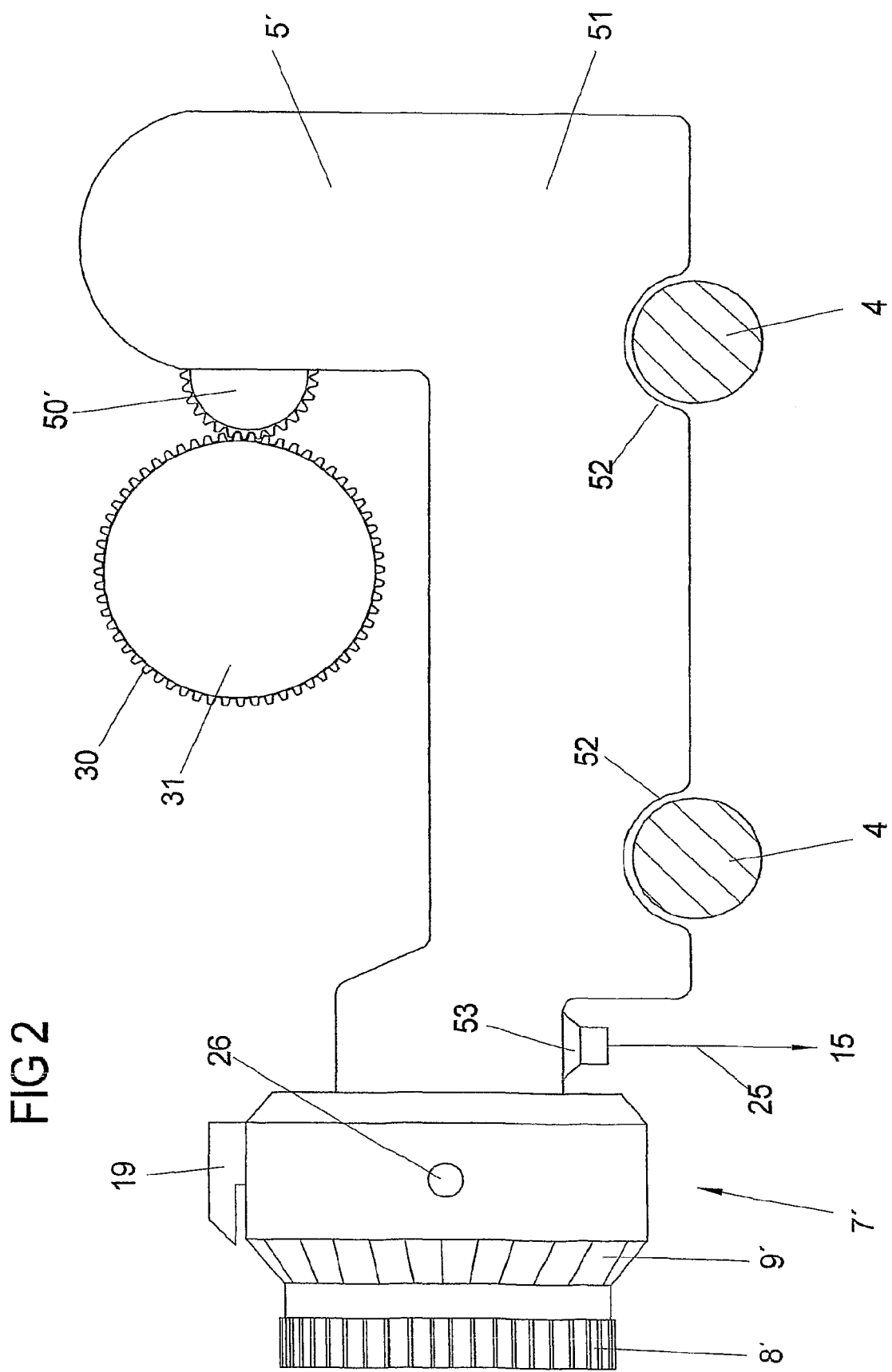
FIG. 2 shows a schematic illustration of an picture definition adjustment on the camera lens of a motion picture camera with a manual follow focus.

FIG. 2 schematically illustrates a manual follow focus 7' for transmitting picture definition adjustments on an picture definition handwheel 8' to the picture definition lens ring 31.

The follow focus 7' comprises a resetting carriage 51 having two clamping connections 52 for connecting the follow focus 7' to the iris rods 4 connected to the housing of the motion picture camera 1. The picture definition handwheel 8' is connected, via a drive axle, to a gear unit 5' which contains a pinion 50', which engages in the external teeth 30 of the picture definition lens ring 31 and converts a resetting of the picture definition handwheel 8' directly into a rotation of the picture definition lens ring 31. The gear unit 5' contains, for example, mutually connected spur gear wheels or belt drives for redirecting the rotary motion of the picture definition handwheel 8' to the pinion 50' in accordance with DE 94 15 170 U1.

The follow focus 7' furthermore comprises a scale dial 9' (which can likewise be written on) and a reference marking 19' for displaying the picture definition setpoint value which is adjusted in each case.

An adapter 53 is arranged on the resetting carriage 51 and connected to the control terminal 15 of the motion picture camera 1 via a line 25. A direct drive or an electromechanical actuator 18 (illustrated in FIG. 3), which readjusts or adjusts the readjusted operating element of the follow focus 7' continuously or at intervals, is provided for readjusting the picture definition handwheel 8 or the scale dial 9.

In the case of the manual follow focus, as well, an auto-focus momentary contact switch 26 can be provided on the follow focus 7' via which the automatic focusing operation is changed over to the manual focusing operation and the relevant operating element 8, 9 of the follow focus 7' is adjusted or readjusted to the last setpoint value of the auto-focusing device before the follow focus 7' outputs a setpoint value.

FIG. 3 shows an exemplary embodiment of an electronically controlled electromechanical actuator 18 for adjusting or readjusting an operating unit 7, 7' in accordance with the above-described exemplary embodiments, which operating unit is intended to be used particularly if the relevant operating unit includes no electromotive drive for outputting a setpoint value. The electromechanical actuator 18 can either be integrated in the manual operating unit 7 according to FIG. 1 or can, for example, be plugged onto the manual follow focus 7' according to FIG. 2 in order to readjust or adjust the picture definition handwheel 8' or the scale dial 9'.

The electromechanical actuator 18 includes a microcomputer 20, which is connected, via a line 25, to the control terminal 15 of the motion picture camera 1 according to FIG. 1 and, on the input side, to an auto-focus momentary contact switch or auto-focus switch 26 for switching from the automatic focusing operation into the manual focusing operation or vice versa. The microcomputer 20 drives an actuating motor 21 connected, via a gear mechanism 22, to the resetting shaft 23 of the picture definition handwheel 8 and/or the scale dial 9. A differential gear mechanism or a clutch can be provided between the picture definition handwheel 8 and the scale dial 9, via which gear mechanism or clutch the picture definition handwheel 8 can be decoupled such that the scale dial 9 with stops, which may be attached thereto, can be reset via the gear mechanism 22 by the electric motor 21 in accordance with the control signals output by the microcomputer 20, without co-rotation of the picture definition handwheel 8.

A reference marking 19 is arranged on the circumference of the scale dial 9 from which the respectively adjusted picture definition setpoint value can be read off.

The resetting shaft 23 is connected to the microcomputer 20 via a position encoder 24 for outputting actual value signals of the adjusted position. The position encoder 24 can, for example, comprise a potentiometer or an absolute encoder with an optoelectronic or electromagnetic detection system.

For readjusting the operating unit in accordance with the setpoint values output by the auto-focusing device 16 according to FIG. 1, the microcomputer 20 receives the respective control signal from the control terminal 15 of the motion picture camera 1 via the line 25, and activates the electric motor 21 in one rotary direction or the other, such that the picture definition handwheel 8 or the scale dial 9 is adjusted via the gear mechanism 22, in accordance with the prescribed setpoint value of the auto-focusing device 16. The position of the picture definition handwheel 8 or the scale dial 9 is detected by the position encoder 24, and the actual value detected in this manner is processed for fine-tuning the adjustment of the operating unit.

For adjusting the picture definition handwheel 8 or the scale dial 9 to the setpoint value output by the auto-focusing device when the automatic focusing operation is changed over to the manual focusing operation, the setpoint value last output by the autofocussing device is fed, via the control terminal 15 of the motion picture camera 1 and the line 25, to the microcomputer 20 when the auto-focus momentary contact switch 21 is operated, which microcomputer 20 appropriately adjusts the picture definition handwheel 8 or the scale dial 9 via the electric motor 21 and the gear mechanism 22 as well as the resetting shaft 23, before, in the manual focusing operation, the setpoint values, adjusted on the picture definition handwheel 8, for adjusting the picture definition are emitted, using the position encoder 24, to the control terminal 15 of the motion picture camera 1.

The design of the invention is not limited to the preferred exemplary embodiments specified above. Rather, a multiplicity of variants which make use of the inventive method are conceivable even in designs of a fundamentally different nature.

The invention claimed is:

1. An apparatus for adjusting the picture definition on a camera lens of a motion picture camera using a drive unit connected to the camera lens with an operating unit, which operating unit has a picture definition handwheel, which outputs control signals for manually adjusting, readjusting or delimiting an adjustment range of a picture definition to the drive unit, and a scale dial for displaying an adjusted picture definition and/or the delimited adjustment range of the picture definition, with an auto-focusing device for measuring the distance from an object to be recorded by the motion picture camera and outputting control signals to the drive unit for controlling the picture definition as a function of the measured distance from the object to be recorded, and with an electromechanical actuator of the operating unit for adjusting or readjusting the picture definition adjusted on the picture definition handwheel or displayed on the scale dial as a function of the control signals output by the auto-focusing device, wherein the scale dial comprises a scale dial which can be written on, whose position in relation to a reference position can be varied as a function of the control signals output by the auto-focusing device, and wherein the scale dial can be connected to stops for delimiting the picture definition adjustment range, whose position on the scale dial can be varied as a function of the control signals output by the auto-focusing device.

2. The apparatus of claim 1, wherein the electromechanical actuator adjusts the picture definition in relation to a reference position on the picture definition handwheel or displays it on the scale dial.

3. The apparatus of claim 1 or 2, wherein the drive unit can be driven using an electric line connection or a radio connection by the operating unit in a manual focusing operation and by the auto-focusing device in an automatic focusing operation, which auto-focusing device, in the automatic focusing operation, outputs control signals both to the drive unit and the operating unit using electric line connections or a radio connection.

4. The apparatus of claim 1, wherein the picture definition handwheel is in the form of an absolute encoder.

5. An apparatus for adjusting the picture definition on a camera lens of a motion picture camera using a drive unit connected to the camera lens, with an operating unit, which operating unit has a picture definition handwheel, which outputs control signals for manually adjusting, readjusting or delimiting an adjustment range of a picture definition to the drive unit, and a scale dial for displaying an adjusted picture definition and/or the delimited adjustment range of the picture definition, with an auto-focusing device for measuring the distance from an object to be recorded by the motion picture camera and outputting control signals to the drive unit for controlling the picture definition as a function of the measured distance from the object to be recorded, and with an electromechanical actuator of the operating unit for adjusting or readjusting the picture definition adjusted on the picture definition handwheel or displayed on the scale dial as a function of the control signals output by the auto-focusing device, wherein the scale dial comprises a scale dial which can be written on, whose position in relation to a reference position can be varied as a function of the control signals output by the auto-focusing device, and wherein the scale dial and/or stops for delimiting the picture definition adjustment range can be changed using a differential gear mechanism without resetting the input device.

6. The apparatus of claim 1, wherein the electromechanical actuator comprises a motor/gear arrangement which can be changed as a function of the control signals output by the auto-focusing device.

7. The apparatus of claim 1, wherein the picture definition handwheel and/or the scale dial can be changed, as a function of the control signals output by the auto-focusing device, using a direct drive, in particular using an electric motor or an ultrasonic motor.

8. The apparatus of claim 6, wherein the picture definition handwheel and/or the scale dial can be connected to the motor/gear arrangement or to the direct drive via a clutch.

9. An apparatus for adjusting the picture definition on a camera lens of a motion picture camera using a drive unit connected to the camera lens with an operating unit, which operating unit has a picture definition handwheel, which outputs control signals for manually adjusting, readjusting or delimiting an adjustment range of a picture definition to the drive unit, and a scale dial for displaying an adjusted picture definition and/or the delimited adjustment range of the picture definition, with an auto-focusing device for measuring the distance from an object to be recorded by the motion picture camera and outputting control signals to the drive unit for controlling the picture definition as a function of the measured distance from the object to be recorded, and with an electromechanical actuator of the operating unit for adjusting or readjusting the picture definition adjusted on the picture definition handwheel or displayed on the scale dial as a function of the control signals output by the auto-focusing device, wherein the operating unit comprises a manual follow focus with a picture definition handwheel and a scale dial with stops for delimiting the picture definition adjustment range, wherein an electric motor can be plugged onto the manual follow focus, which electric motor can be disconnected during a manual focusing operation, and in that the electric motor can be driven by the auto-focusing device in an automatic focusing operation such that the position of the picture definition handwheel and/or the scale dial and/or the stops for delimiting the picture definition adjustment range can be varied as a function of the control signals output by the auto-focusing device.

10. The apparatus of claim 9, wherein during the manual focusing operation the electric motor can be disconnected electrically.

11. The apparatus of claim 9, wherein during the manual focusing operation the electric motor can be disconnected using a clutch which can be released.

12. The apparatus of claim 9, wherein the operating unit is connected via a position encoder to a microprocessor which changes the input and/or display device of the operating unit as a function of the control signals output by the auto-focusing device using an actuating motor and a gear mechanism, and in that an auto-focus momentary contact switch or auto-focus switch is connected to an input of the microprocessor for initiating the automatic or manual focusing operation.

13. The apparatus of claim 12, wherein the auto-focus momentary contact switch triggers a transfer of a picture definition setpoint value, output by the auto-focusing device to the drive unit connected to the camera lens.

14. The apparatus of claim 12, wherein the auto-focus switch activates the automatic focusing operation in a first position, and the manual focusing operation in a second position, and in that the control signals of the auto-focusing device are applied to the operating unit in the first position of the auto-focus switch and/or when the auto-focus switch is switched over from the first position to the second position.

15. An apparatus for adjusting the picture definition on a camera lens of a motion picture camera, said apparatus comprising:

a drive unit connected to the camera lens;

an operating unit comprising a scale dial for displaying an adjusted picture definition and/or a delimited adjustment range of the picture definition;

an auto-focusing device for measuring the distance from an object to be recorded by the motion picture camera and outputting control signals to the drive unit for controlling the picture definition as a function of the measured distance from the object to be recorded; and an electromechanical actuator of the operating unit for adjusting or readjusting the picture definition displayed on the scale dial as a function of the control signals output by the auto-focusing device, said scale dial being connected to stops for delimiting the picture definition adjustment range, whose position on the scale dial can be varied as a function of the control signals output by the auto-focusing device.

16. The apparatus of claim 15, wherein the scale dial can be written on, whose position in relation to a reference position can be varied as a function of the control signals output by the auto-focusing device.

17. The apparatus of claim 15, wherein the scale dial and/or the stops for delimiting the picture definition adjustment range can be changed using a differential gear mechanism without changing the input device.

18. An apparatus for adjusting the picture definition on a camera lens of a motion picture camera, said apparatus comprising:

a drive unit connected to the camera lens;

an operating unit comprising a manual follow focus with a picture definition handwheel, which outputs control signals for manually adjusting, readjusting or delimiting an adjustment range of a picture definition to the drive unit, and a scale dial for displaying an adjusted picture definition and/or a delimited adjustment range of the picture definition;

an auto-focusing device for measuring the distance from an object to be recorded by the motion picture camera and outputting control signals to the drive unit for controlling the picture definition as a function of the measured distance from the object to be recorded; and an electromechanical actuator of the operating unit for adjusting or readjusting the picture definition adjusted on the picture definition handwheel or displayed on the scale dial as a function of the control signals output by the auto-focusing device, said electromechanical actuator being driven by the auto-focusing device in an automatic focusing operation such that the position of the picture definition handwheel can be varied, said scale dial being connected to stops for delimiting the picture definition adjustment range, whose position on the scale dial can be varied as a function of the control signals output by the auto-focusing device.

19. The apparatus of claim 18, wherein the electromechanical actuator adjusts the picture definition in relation to a reference position on the picture definition handwheel or displays it on the scale dial.

20. The apparatus of claim 18, wherein an electric motor can be plugged onto the manual follow focus, which electric motor can be disconnected during a manual focusing operation, and wherein the electric motor can be driven by the auto-focusing device in an automatic focusing operation such that the position of the picture definition handwheel and/or the scale dial and/or the stops for delimiting the picture definition adjustment range can be varied as a function of the control signals output by the auto-focusing device.

21. The apparatus of claim 20, wherein during the manual focusing operation the electric motor can be disconnected electrically.

22. The apparatus of claim 20, wherein during the manual focusing operation the electric motor can be disconnected using a clutch which can be released.

23. The apparatus of claim 18, wherein the operating unit is connected via a position encoder to a microprocessor which changes the input and/or display device of the operating unit as a function of the control signals output by the auto-focusing device using an actuating motor and a gear mechanism, and wherein an auto-focus momentary contact switch or auto-focus switch is connected to an input of the microprocessor for initiating an automatic or manual focusing operation.

24. The apparatus of claim 23, wherein the auto-focus momentary contact switch triggers a transfer of a picture definition setpoint value, output by the auto-focusing device to the drive unit connected to the camera lens.

25. The apparatus of claim 23, wherein the auto-focus momentary switch activates the automatic focusing operation in a first position, and the manual focusing operation in a second position, and wherein the control signals of the auto-focusing device are applied to the operating unit in the first position of the auto-focus switch and/or when the auto-focus switch is switched over from the first position to the second position.

* * * * *